Figure 1:
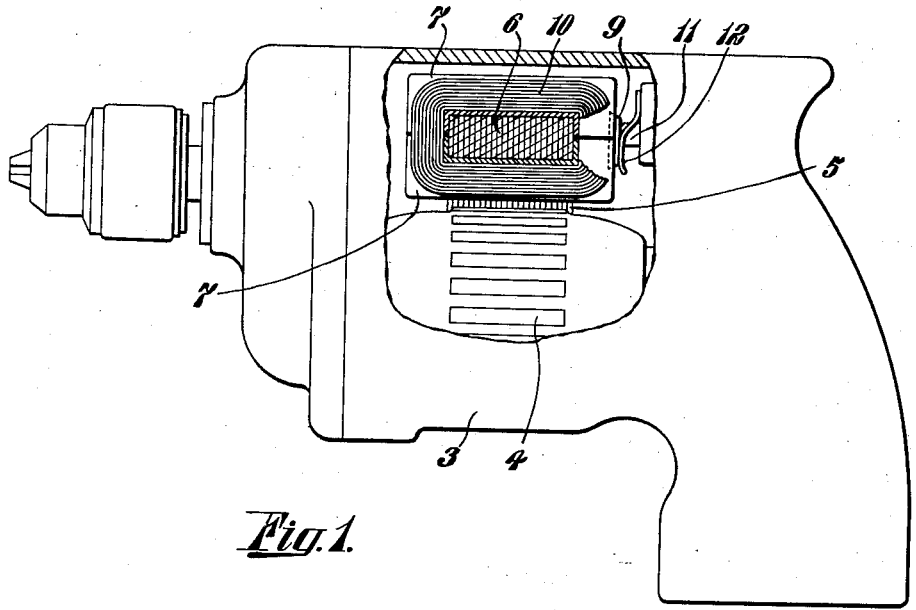

June 23, 1936.  C. DESOUTTER  2,045,218
ELECTRIC MOTOR
Filed Oct. 15, 1935

Inventor
Charles Desoutter
By Bihinger, atty.

Patented June 23, 1936

2,045,218

UNITED STATES PATENT OFFICE 2,045,218

ELECTRIC MOTOR

Charles Desoutter, London, England

Application October 15, 1935, Serial No. 45,148
In Great Britain October 22, 1934

2 Claims. (Cl. 172—36)

This invention relates to electric motors for rotary tool devices carried and applied by hand such as electric drills or the like.

According to the invention the electric motor in such hand-carried and applied portable electric tools has a horse-shoe field magnet and winding removable as a unitary structure from the casing of the motor, the winding being provided with integral or fixedly associated contact elements to co-operate, preferably by spring pressure, with other contacts located within the said casing and enclosed thereby so as to make electrical connection with said contact elements when the said horse-shoe magnet and winding are inserted into position in the casing and break such electrical connection on the removal of the horse-shoe magnet and winding.

Thus the horse-shoe field magnet with its single or multiple windings, readily can be mounted or dismounted into or out of position, and when so mounted the winding or windings automatically are connected to and remain in the essential circuit or circuits. In this manner, the necessity for soldering or otherwise connecting the winding or windings of the horse-shoe field magnet to the other part of the circuit or circuits is avoided and consequently assembly is facilitated and necessary repairs or replacements carried out with great expedition.

As will be realized, the invention may be carried into effect in many ways and the drawing illustrates one method only.

In the drawing, a hand-applied portable drill adapted to be supported by hand in the manner of a pistol is shown, the electric motor of which has a somewhat horse-shoe shaped field magnet having associated therewith a single winding.

Figure 2:
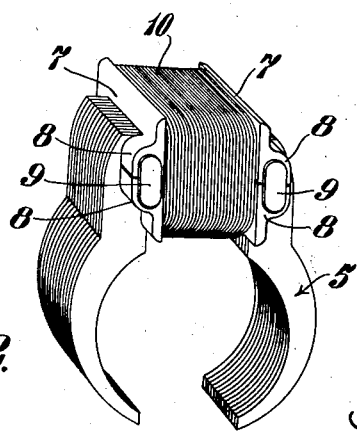

Fig. 1 is a front elevation of the tool with the casing partly broken away and with the revealed portion partly in section, whilst Fig. 2 is a perspective view of the detached unitary structure comprising the field magnet with its winding and contacts.

In the drawing 3 is the outer main casing which has mounted therein, in any usual manner, the armature 4 with which co-operates the field magnet shown detached in Fig. 2.

This latter comprises a somewhat horse-shoe shaped laminated field magnet proper 5 having a yoke 6 surrounded by the two halves 7 of a flanged spool of insulating material, such as a moulded synthetic resin. The flanges extend beyond the end laminations and at one end have enlargements 8.

The upper and lower halves of these enlargements on each side and at the ends are formed with recesses bounded by undercut dovetail edges. Each pair of these recesses houses a contact making plate 9 of suitable metal having dovetail edges engaging the edges of the recesses, as shown. To these plates the ends of a winding 10 located around the spool and yokes are electrically connected, for example by soldering.

The unitary structure shown in Fig. 2 and comprising the complete field magnet system is suitably mounted within, and held in position in the casing 3.

When so mounted the contact plates 9 are pressed into contact with co-operating contact members suitably carried in the casing and connected to the inner circuit or circuits. Such contacts are illustrated in Fig. 1 by a spring-pressed pin 11 and a spring strip 12. It will be realized that in place of the structure described, the contact plates, such as 9, may be replaced by springy contacts to co-operate with spring or other contacts.

Further in place of the particular contact plates 9 such as shown and the co-operating contact members, it will be realized that any other suitable forms of co-operating contacts may be utilized, provided they automatically make contact when the winding is mounted in position and break the contact when the winding is removed.

Although in the particular example illustrated only a single winding has been shown, it is obvious that more than one winding may be utilized. Further, where more than one winding is included each winding may have its own contacts, or the whole of the windings or groups of them may be associated with particular contacts. Similarly although only one field magnet is shown, any suitable and required number of field magnets may be utilized.

The invention is not limited to the precise forms or details of construction described, as these may be varied to suit particular cases.

What I claim and desire to secure by Letters Patent of the United States of America is:—

1. An electric motor for a rotary tool device carried and applied by hand, having a casing, an armature in said casing, a horse-shoe field magnet and winding removable from said casing as a unitary structure independently of the armature, contact elements electrically connected to and in fixed association with said winding and other contacts located within said casing and enclosed thereby adapted to make electrical connection with said contact elements of the winding on insertion of said unitary structure in position in the casing and to break such electrical connection on the removal of said unitary structure, for the purposes set forth.

2. An electric motor for a rotary tool device carried and applied by hand, having a casing, an armature in said casing, a horse-shoe field magnet and winding removable from said casing as a unitary structure independently of the armature, contact elements electrically connected to and in fixed association with said winding, other contacts located within said casing and enclosed thereby adapted to make electrical connection with said contact elements of the winding on insertion of said unitary structure in position in the casing and to break such electrical connection on the removal of said unitary structure and spring pressure means to maintain the electrical connection between the parts when the unitary structure is in position in the casing, for the purposes set forth.

CHARLES DESOUTTER.